United States Patent
Casamassima et al.

(10) Patent No.: US 12,323,943 B2
(45) Date of Patent: Jun. 3, 2025

(54) SYSTEM AND METHOD FOR FACILITATING LOCALIZING AN EXTERNAL OBJECT

(71) Applicant: NXP B.V., Eindhoven (NL)

(72) Inventors: Filippo Casamassima, Thal (AT); Klaas Brink, Waalre (NL); Wolfgang Eber, Graz (AT)

(73) Assignee: NXP B.V., Eindhoven (NL)

( * ) Notice: Subject to any disclaimer, the term of this patent is extended or adjusted under 35 U.S.C. 154(b) by 257 days.

(21) Appl. No.: 17/807,912

(22) Filed: Jun. 21, 2022

(65) Prior Publication Data
US 2022/0408400 A1    Dec. 22, 2022

(30) Foreign Application Priority Data
Jun. 22, 2021  (EP) ..................................... 21180982

(51) Int. Cl.
*H04W 24/00*  (2009.01)
*H04W 64/00*  (2009.01)

(52) U.S. Cl.
CPC .................................. *H04W 64/00* (2013.01)

(58) Field of Classification Search
CPC ....... H04W 64/00; H04W 4/80; G01S 5/0289; G01S 5/0278; G01S 13/08; G07C 9/00309; G07C 2209/63; G06N 3/02; G06N 20/00
See application file for complete search history.

(56) References Cited

U.S. PATENT DOCUMENTS

| 6,121,927 | A  | * | 9/2000  | Kalliojarvi ................ G01S 3/46 342/453 |
| RE48,832  | E  | * | 11/2021 | Marrow ................ G01S 1/0428 |
| 11,941,963 | B2 | * | 3/2024  | Casamassima ........ G08B 13/08 |
| 11,942,984 | B2 |   | 3/2024  | Tertinek et al. |

(Continued)

OTHER PUBLICATIONS

Ledergerber, A., et al., "A Multi-Static Radar Network with Ultra-Wideband Radio-Equipped Devices," Institute for Dynamic Systems and Control, ETH Zurich, 8092 Zurich, Switzerland, 20 pages, Feb. 7, 2020.

(Continued)

*Primary Examiner* — Stephen M D'Agosta

(57) ABSTRACT

In accordance with a first aspect of the present disclosure, a system is provided for facilitating localizing an external object, the system comprising: a plurality of ultra-wideband (UWB) communication nodes; a controller operatively coupled to said plurality of UWB communication nodes, wherein the controller is configured to: cause at least one of the UWB communication nodes to transmit one or more UWB messages to other UWB communication nodes of said plurality of UWB communication nodes; receive a channel impulse response (CIR) estimate and/or one or more parameters relating to said CIR output by the UWB communication nodes in response to receiving said UWB messages; analyze said CIR estimate and/or said parameters relating to the CIR; select a localization process in dependence on a result of analyzing said CIR estimate and/or said parameters relating to the CIR. In accordance with further aspects of the present disclosure, a corresponding method is conceived, and a computer program for carrying out said method is provided.

17 Claims, 8 Drawing Sheets

(56) References Cited

U.S. PATENT DOCUMENTS

| | | | |
|---|---|---|---|
| 2004/0214568 A1* | 10/2004 | Anderson | H04M 3/42382 |
| | | | 455/404.1 |
| 2007/0248047 A1* | 10/2007 | Shorty | H04L 45/44 |
| | | | 370/329 |
| 2009/0192709 A1* | 7/2009 | Yonker | G01C 21/20 |
| | | | 701/470 |
| 2016/0259032 A1* | 9/2016 | Hehn | H04W 84/18 |
| 2018/0234797 A1 | 8/2018 | Ledvina et al. | |
| 2020/0314735 A1* | 10/2020 | Aijaz | H04W 52/46 |
| 2020/0348406 A1 | 11/2020 | Jain et al. | |
| 2021/0211327 A1* | 7/2021 | Tertinek | H04B 1/71637 |
| 2021/0219097 A1* | 7/2021 | Jain | H04W 4/029 |
| 2021/0302536 A1* | 9/2021 | Casamassima | H04W 4/80 |
| 2022/0291374 A1* | 9/2022 | Ryu | G01S 13/878 |
| 2022/0383716 A1* | 12/2022 | Casamassima | H04B 1/7163 |
| 2022/0408400 A1* | 12/2022 | Casamassima | G01S 5/0278 |
| 2023/0071554 A1* | 3/2023 | Zhang | H04W 76/16 |

OTHER PUBLICATIONS

Rana, S., et al., "UWB localization employing supervised learning method," 2017 IEEE 17th International Conference on Ubiquitous Wireless Broadband (ICUWB), pp. 1-5, Sep. 12-15, 2017.

Shirinabadi, P., et al., "UWB Channel Classification Using Convolutional Neural Networks," 2019 IEEE 10th Annual Ubiquitous Computing, Electronics & Mobile Communication Conference (UEMCON), pp. 1064-1068, Oct. 10-12, 2019.

* cited by examiner

SYSTEM AND METHOD FOR FACILITATING LOCALIZING AN EXTERNAL OBJECT

CROSS-REFERENCE TO RELATED APPLICATIONS

This application claims the priority under 35 U.S.C. § 119 of European Patent application no. 21180982.7, filed on Jun. 22, 2021, the contents of which are incorporated by reference herein.

TECHNICAL FIELD

The present disclosure relates to a system for facilitating localizing an external object. Furthermore, the present disclosure relates to a corresponding method for facilitating localizing an external object, and to a corresponding computer program.

BACKGROUND

Ultra-wideband (UWB) is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices.

SUMMARY

In accordance with a first aspect of the present disclosure, a system is provided for facilitating localizing an external object, the system comprising: a plurality of ultra-wideband (UWB) communication nodes; a controller operatively coupled to said plurality of UWB communication nodes, wherein the controller is configured to: cause at least one of the UWB communication nodes to transmit one or more UWB messages to other UWB communication nodes of said plurality of UWB communication nodes; receive a channel impulse response (CIR) estimate and/or one or more parameters relating to said CIR output by the UWB communication nodes in response to receiving said UWB messages; analyze said CIR estimate and/or said parameters relating to the CIR; select a localization process in dependence on a result of analyzing said CIR estimate and/or said parameters relating to the CIR.

In one or more embodiments, the controller is configured to analyze said CIR estimate and/or said parameters relating to the CIR using a machine learning algorithm.

In one or more embodiments, the machine learning algorithm is primarily a decision tree algorithm, a neural network, a nearest neighbour algorithm, or a support vector machine.

In one or more embodiments, the controller is further configured to feed, in a training phase of the system, the machine learning algorithm with data indicative of an environment around the system.

In one or more embodiments, the parameters relating to the CIR include at least one of the following parameters: a power level; a strongest path amplitude ratio; a strongest path time difference; a spectral power; a first path width; a first path prominence.

In one or more embodiments, the localization process is an algorithm for localizing the external object.

In one or more embodiments, the algorithm for localizing the external object is a machine learning algorithm.

In one or more embodiments, the external object is a device for accessing a vehicle, and the UWB communication nodes are UWB anchors comprised in or attached to said vehicle.

In one or more embodiments, the device for accessing the vehicle is a key fob or a mobile device.

In accordance with a second aspect of the present disclosure, a method is conceived for facilitating localizing an external object, the method comprising: causing, by a controller, at least one of a plurality of UWB communication nodes to transmit one or more UWB messages to other UWB communication nodes of said plurality of UWB communication nodes; receiving, by the controller, a channel impulse response, CIR, estimate and/or one or more parameters relating to said CIR output by the UWB communication nodes in response to receiving said UWB messages; analyzing, by the controller, said CIR estimate and/or said parameters relating to the CIR; selecting, by the controller, a localization process in dependence on a result of analyzing said CIR estimate and/or said parameters relating to the CIR.

In one or more embodiments, the controller analyzes said CIR estimate and/or said parameters relating to the CIR using a machine learning algorithm.

In one or more embodiments, the machine learning algorithm is primarily a decision tree algorithm, a neural network, a nearest neighbour algorithm, or a support vector machine.

In one or more embodiments, the controller feeds, in a training phase of the system, the machine learning algorithm with data indicative of an environment around the system.

In one or more embodiments, the parameters relating to the CIR include at least one of the following parameters: a power level; a strongest path amplitude ratio; a strongest path time difference; a spectral power; a first path width; a first path prominence.

In accordance with a third aspect of the present disclosure, a computer program is provided, comprising executable instructions which, when executed by a controller, cause said controller to carry out a method of the kind set forth.

DESCRIPTION OF DRAWINGS

Embodiments will be described in more detail with reference to the appended drawings, in which.

DESCRIPTION OF EMBODIMENTS

Figure 1:
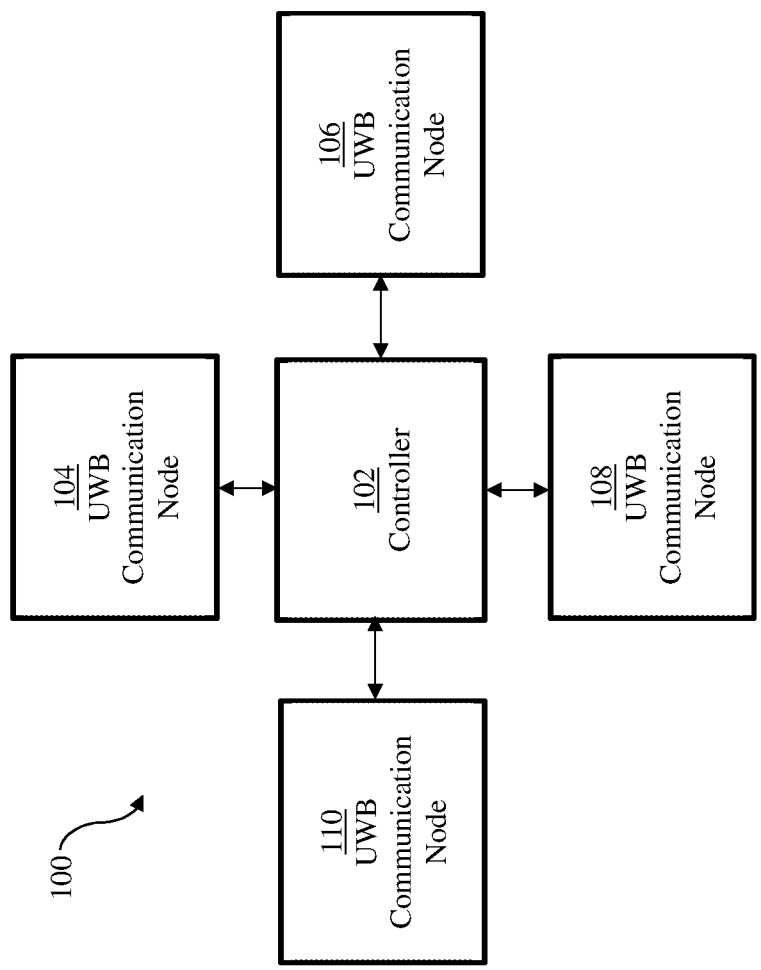
FIG. 1 shows an illustrative embodiment of a system for facilitating localizing an external object.

As mentioned above, ultra-wideband (UWB) is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices.

UWB technology—also referred to as impulse-radio ultra-wideband (IR-UWB)—is a RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range, velocity, and/or angle relative to the other smart device. In order to measure these parameters, UWB transceivers may operate in different modes of operation, such as a ranging mode, an angle-of-arrival (AoA) mode and a radar mode. In another example, UWB technology may be used for accessing a building or a predefined space within a building.

In the ranging mode of operation, frames will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). The AoA mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two phase values, and an AoA is calculated based on the PDoA. In the radar mode of operation, frames are transmitted by at least one device and those frames are received by the same device and/or by one or more other devices. Then, the CIRs are estimated on the device or devices receiving the frames, and the range and/or velocity and/or AoA are calculated based on the estimated CIRs. The skilled person will appreciate that these are non-limiting examples of how the different modes of operation can be implemented. In other words, the modes may be implemented differently, depending on the requirements imposed by the application, for example.

Accordingly, smart vehicle access systems may employ UWB technology to enable access to a vehicle, in particular by facilitating ranging operations between a key fob or a mobile device providing a similar functionality and one or more UWB anchors in the vehicle. However, localization processes that are based on an analysis of the channel impulse responses (CIRs) on the key fob or mobile device and UWB anchors, respectively, may be affected by the environment around the vehicle. More specifically, in some environments, a given localization process (i.e., a localization algorithm for localizing the key fob or mobile device) may perform well, while the same localization process may not perform well in another environment. Therefore, there may exist a need to facilitate a more robust localization of the key fob or mobile device by the localization system of the vehicle.

Now discussed are a system and a method for facilitating a more robust localization of an external object. The external object may for example be a key fob or mobile device used for accessing a vehicle. More specifically, the presently disclosed system and method facilitate localizing the external object reliably in different environments in which the system may be used.

FIG. 1 shows an illustrative embodiment of a system 100 for facilitating localizing an external object. The system 100 comprises a controller 102 and a plurality of UWB communication nodes 104, 106, 108, 110. The controller 102 is configured to cause at least one of the UWB communication nodes 104, 106, 108, 110 to transmit one or more UWB messages to other UWB communication nodes of said plurality of UWB communication nodes 104, 106, 108, 110. For instance, the controller 102 may send an instruction or command to the at least one of the UWB communication nodes 104, 106, 108, 110, which triggers said communication node or nodes to transmit the UWB messages. Furthermore, the controller 102 is configured to receive a channel impulse response (CIR) estimate and/or one or more parameters relating to said CIR output by the UWB communication nodes 104, 106, 108, 110 in response to receiving said UWB messages. Furthermore, the controller 102 is configured to analyze the CIR estimate and/or the parameters relating to the CIR. Furthermore, the controller 102 is configured to select a localization process in dependence on a result of analyzing said CIR estimate and/or said parameters relating to the CIR. In this way, a more robust localization of the external object is facilitated.

In particular, the UWB communication nodes already present in an object or attached thereto for the purpose of enabling or granting access to the object, may be reused to select a suitable localization process. These UWB communication nodes are often referred to as anchors. For instance, in a practical implementation, the external object is a device for accessing a vehicle, and the UWB communication nodes are UWB anchors comprised in or attached to said vehicle. When the vehicle is parked, the UWB anchors can be used to exchange messages. This will allow to estimate the channel impulse response (CIR) and to derive parameters from the CIR. The inventors have recognized that by analyzing this CIR and/or the parameters derived from the CIR, a suitable localization process for localizing the external object (e.g., a key fob or mobile device) may be selected, while the power consumption of the system remains at an acceptable level. Accordingly, the existing UWB infrastructure in the vehicle may be re-used, by extending its purposes to increasing the robustness of an access device localization.

Compared to other techniques which might be used to increasing said robustness, such as techniques based on UWB-based radar, the power consumption and the computation effort are low.

In one or more embodiments, the controller is configured to analyze said CIR estimate and/or said parameters relating to the CIR using a machine learning algorithm. In this way, the analysis of the estimated CIR and the parameters relating thereto is facilitated. This, in turn, further facilitates properly localizing the external object. In a practical implementation, the machine learning algorithm is primarily a decision tree algorithm, a neural network, a nearest neighbour algorithm, or a support vector machine. In one or more embodiments, the controller is further configured to feed, in a training phase of the system, the machine learning algorithm with data indicative of an environment around the system. In this way, the analysis of the estimated CIR and/or the parameters relating thereto may be optimized, in the sense that the environment of the system may be taken into account. In one or more embodiments, the parameters relating to the CIR include at least one of the following parameters: a power level, a strongest path amplitude ratio, a strongest path time difference, a spectral power, a first path width, and a first path prominence. These parameters are particularly suitable for the purpose of selecting a suitable localization process.

More specifically, the parameters may be calculated from the CIR. In a simplified representation, the CIR has a peak every time there was a reflection in the signal. The first peak is thus the so-called first path (i.e., the shortest path the RF signal could travel from the transmitter to the responder). It is noted that there can be another peak corresponding to a reflection in the CIR. In that case, if the first path (FP) is attenuated a reflection can be stronger, thus the strongest path can arrive later than the first path. Accordingly, the strongest path amplitude ratio is the ratio between the strongest path and the first path. Furthermore, strongest path time difference is the time (or distance) difference between the first path and the strongest path. In other words, the strongest path time difference may be the period that elapses between the moment the first path and the strongest path arrive at the receiver. Furthermore, the spectral power is the Fast Fourier Transform (FFT) of the CIR. Furthermore, the FP width is the width of the first path peak.

In a practical implementation, the localization process is an algorithm for localizing the external object. In one or more embodiments, the algorithm for localizing the external object is a machine learning algorithm. A machine learning algorithm is particularly suitable for the purpose of localizing an object.

Figure 2:
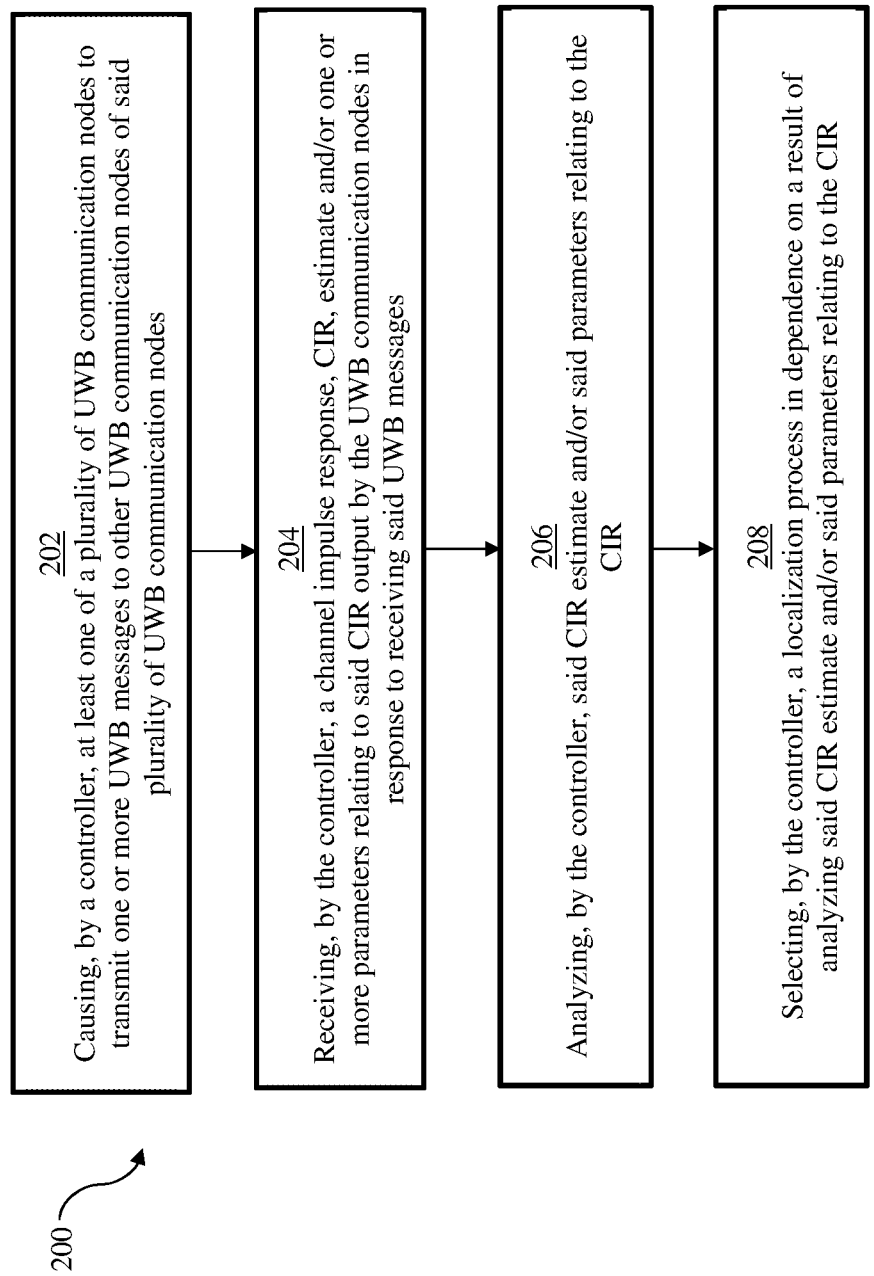
FIG. 2 shows an illustrative embodiment of a method for facilitating localizing an external object.

FIG. 2 shows an illustrative embodiment of a method 200 for facilitating localizing an external object. The method 200 comprises the following steps. At 202, a controller causes at least one of a plurality of UWB communication nodes to transmit one or more UWB messages to other UWB communication nodes of said plurality of UWB communication nodes. Furthermore, at 204, the controller receives a CIR estimate and/or one or more parameters relating to said CIR output by the UWB communication nodes in response to receiving said UWB messages. Furthermore, at 206, the controller analyzes the CIR estimate and/or the parameters relating to the CIR. Furthermore, at 208, the controller selects a localization process in dependence on a result of analyzing said CIR estimate and/or said parameters relating to the CIR. As mentioned above, in this way, a more robust localization of the external object is facilitated.

Figure 3:
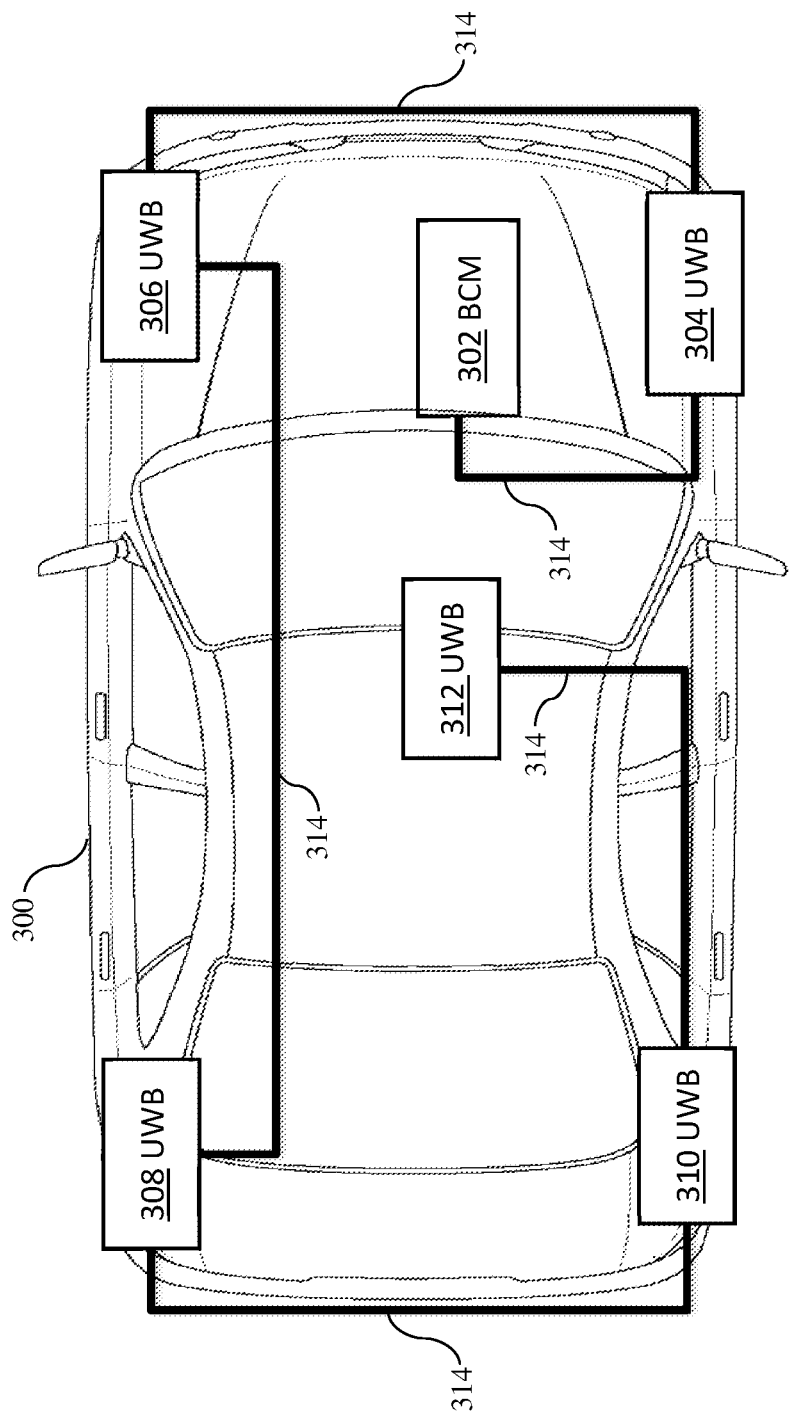
FIG. 3 shows an illustrative embodiment of a vehicle.

FIG. 3 shows an illustrative embodiment of a vehicle 300. The vehicle 300 comprises a system for facilitating localizing an external object of the kind set forth. The system includes a controller of the kind set forth, which is implemented as a body control module (BCM) 302. Furthermore, the system comprises a plurality of UWB communication nodes of the kind set forth, which are implemented as UWB anchors 304, 306, 308, 310, 312. The body control module (BCM) 302 is operatively coupled to the UWB anchors 304, 306, 308, 310, 312 through a network 314, which may be implemented as a controller area network (CAN). More specifically, the UWB anchors 304, 306, 308, 310, 312 are connected to a central unit, i.e. the BCM 302, which is capable of controlling ranging operations and reading the results of said ranging operations. Each UWB anchor may be able to send and receive UWB messages and to output an estimate of the CIR resulting from the transmission and reception of the UWB messages. Alternatively, or in addition, the UWB anchors 304, 306, 308, 310, 312 may be able to calculate parameters relating to the CIR, which may be provided to the BCM 302. It is noted that a typical architecture for car access applications uses four outside anchors (located at the corners of the car) and multiple inside anchors, for example three in the car cabin and one in the trunk area.

As noted above, the localization of a key fob or another access device may be negatively affected by changing environments. Furthermore, it is noted that changing environments are typical for car access applications. For instance, a car or another vehicle may be located in a basement garage, in a crowded parking lot, or in an open space. These environments may have significantly different impacts on the performance of the localization process. Techniques like channel fingerprinting are not suitable for car access scenarios, since the environment is continually changing for a moving vehicle. Furthermore, the communication of a key fob to a car may be affected by the presence or absence of objects in the line of sight (LOS) path. Typically, it is not known whether the key fob communication is performed in an LOS scenario or not. Using one of the car anchors in a radar mode also has a significant current consumption, and thus require an amount of power that might not be available in a car access scenario.

The presently disclosed system and method may be used as follows in a car access scenario, to facilitate a proper localization of a key fob. In a car equipped with UWB anchors anchor-to-anchor communication may be used to scan the environment surrounding the vehicle. In particular, this anchor-to-anchor communication may yield information on the presence of other objects that can affect the communication with a key fob. By analyzing the channel impulse response from messages between the anchors, it may be possible to obtain valuable information about the environment around the car. For instance, it may be possible to determine whether the car is located in a garage, in an empty parking lot, or in a dense parking lot. This information may help to choose which localization algorithm will be used to localize the key fob. The information about the environment may also be used to choose between different pre-trained machine learning algorithms that are used to localize the key fob. Thus, the localization algorithm may be a pre-trained machine learning algorithm. Another advantage of the presently disclosed system and method is that anchor-to-anchor communication is significantly more energy-efficient than operating a UWB device in a radar mode, since sending only one message by one anchor to all the other anchors may suffice.

Figure 4B:
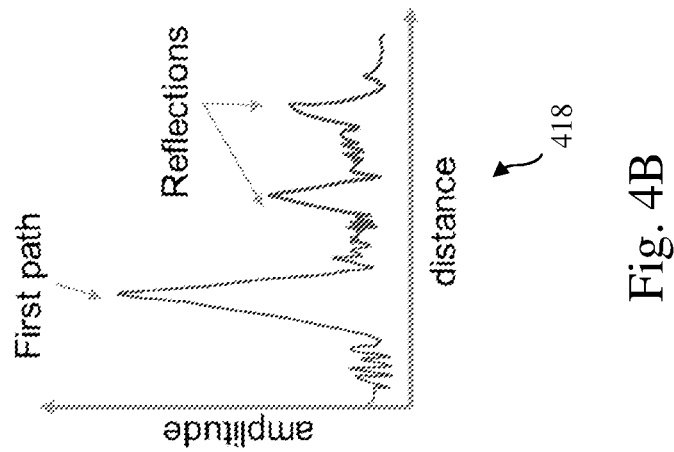
FIG. 4B shows an illustrative embodiment of a channel impulse response.
Figure 4A:
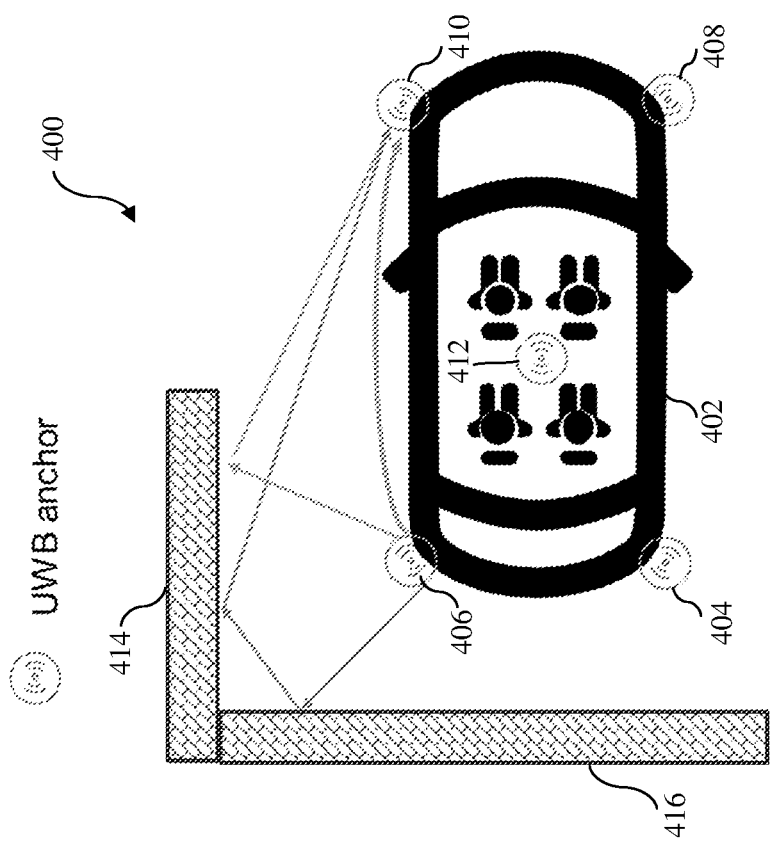
FIG. 4A shows an illustrative embodiment of an environment around a vehicle.

FIGS. 4A and 4B shows an illustrative embodiment of an environment 400 around a vehicle 402, and a corresponding channel impulse response 418, respectively. In particular, a car 402 is equipped for UWB-based smart access and/or for UWB-based relay protection. For this purpose, the car 402 contains several UWB anchors 404, 406, 408, 410, 412 distributed in different locations, for example some inside the car cabin, and some outside the car. In order to grant access to the vehicle 402, UWB messages are typically exchanged between one or more anchors and an external key fob (not shown). In a typical smart car access use case, the key fob is detected by means of Bluetooth low energy (BLE) communication with the car 402. In such a case the distance between the car 402 and the key fob is still large, so the determination of the environment using the CIR analysis based on anchor-to-anchor communication may still be performed while the key fob is far away. Alternatively, in case the detection of the key fob is fully UWB-based, the anchor-to-anchor characterization (i.e., the CIR analysis based on anchor-to-anchor communication) may be performed in between ranging rounds with the key fob. After the message exchange, the car 402 has an estimation of the distance of the key fob from each anchor, and a localization algorithm can be used to estimate the location of the key fob. It is also possible to analyze the CIR (for the anchor-fob communication) and use a machine learning algorithm or analytical method to estimate the location of the key fob. This technique can be applied for detecting whether the key fob is inside or outside the car cabin, because the channel (CIR) is significantly different if the key is inside. If the car access system has more information on the environment surrounding the vehicle, using the presently disclosed system or method, then different algorithms can be used accordingly. For example, if it is known that the car 402 is in an open parking lot, then it follows that there is no source of reflections and the distance estimation of the key fob can be affected only by the human body. However, as shown in FIG. 4B, if the car 402 is next to walls 414, 416 (i.e., in a garage situation) then the CIR 418 will show, in addition to the first path, peaks corresponding to the reflections caused by the walls 414, 416.

Figure 5A:
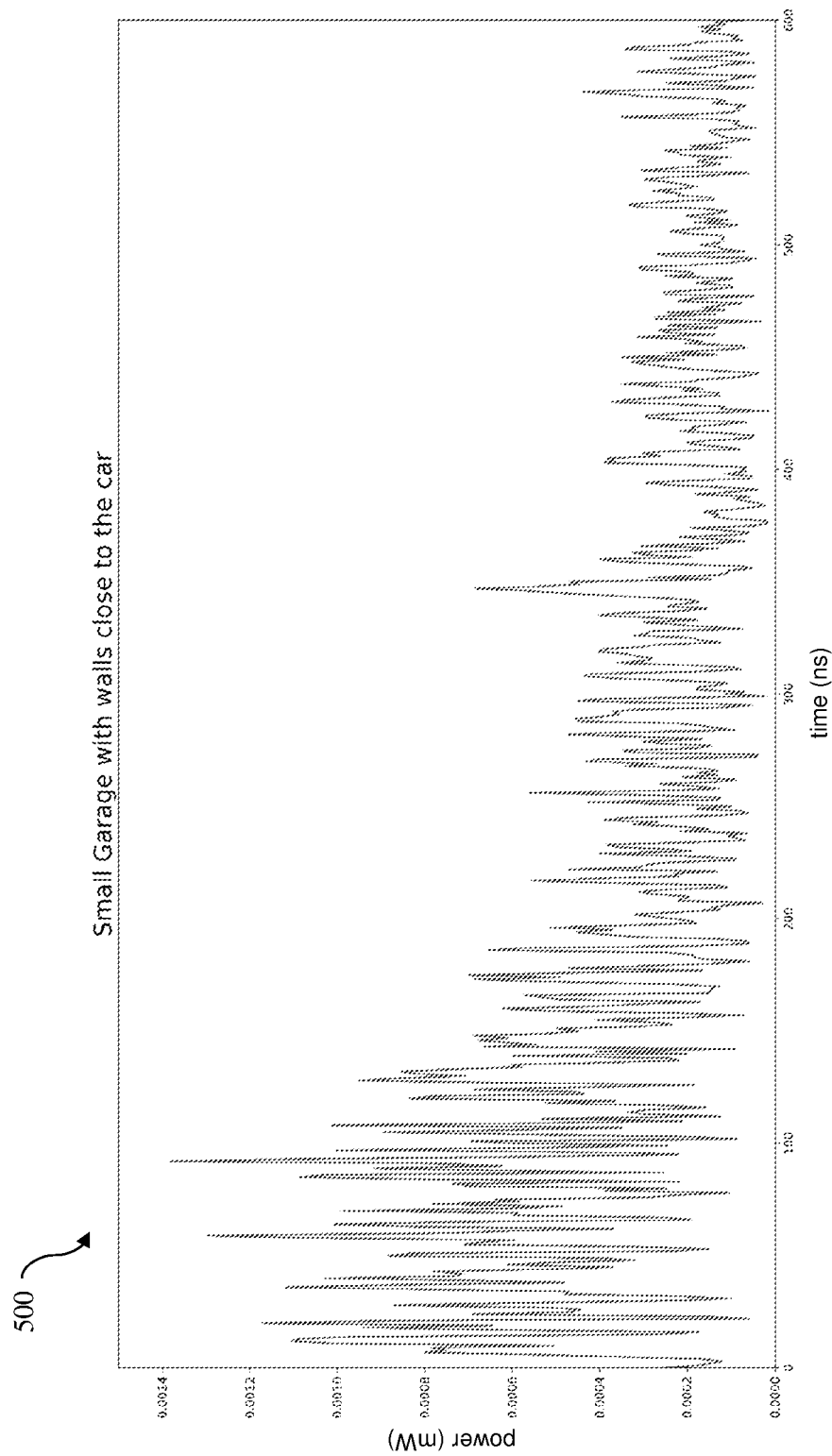
FIG. 5A shows an illustrative embodiment of a channel impulse response in a reflective environment.
Figure 5B:
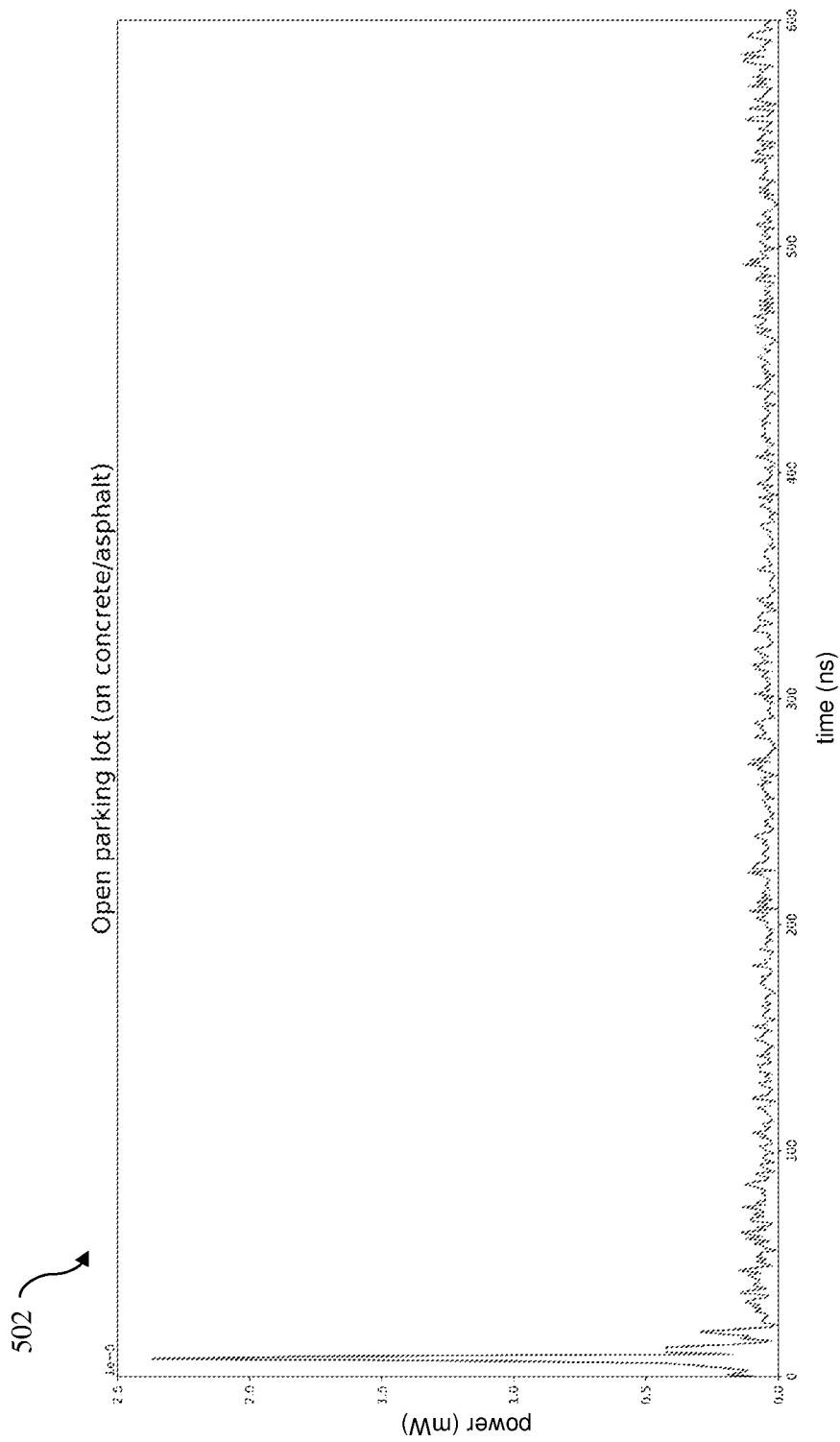
FIG. 5B shows an illustrative embodiment of a channel impulse response in a highly damped environment.
Figure 5C:
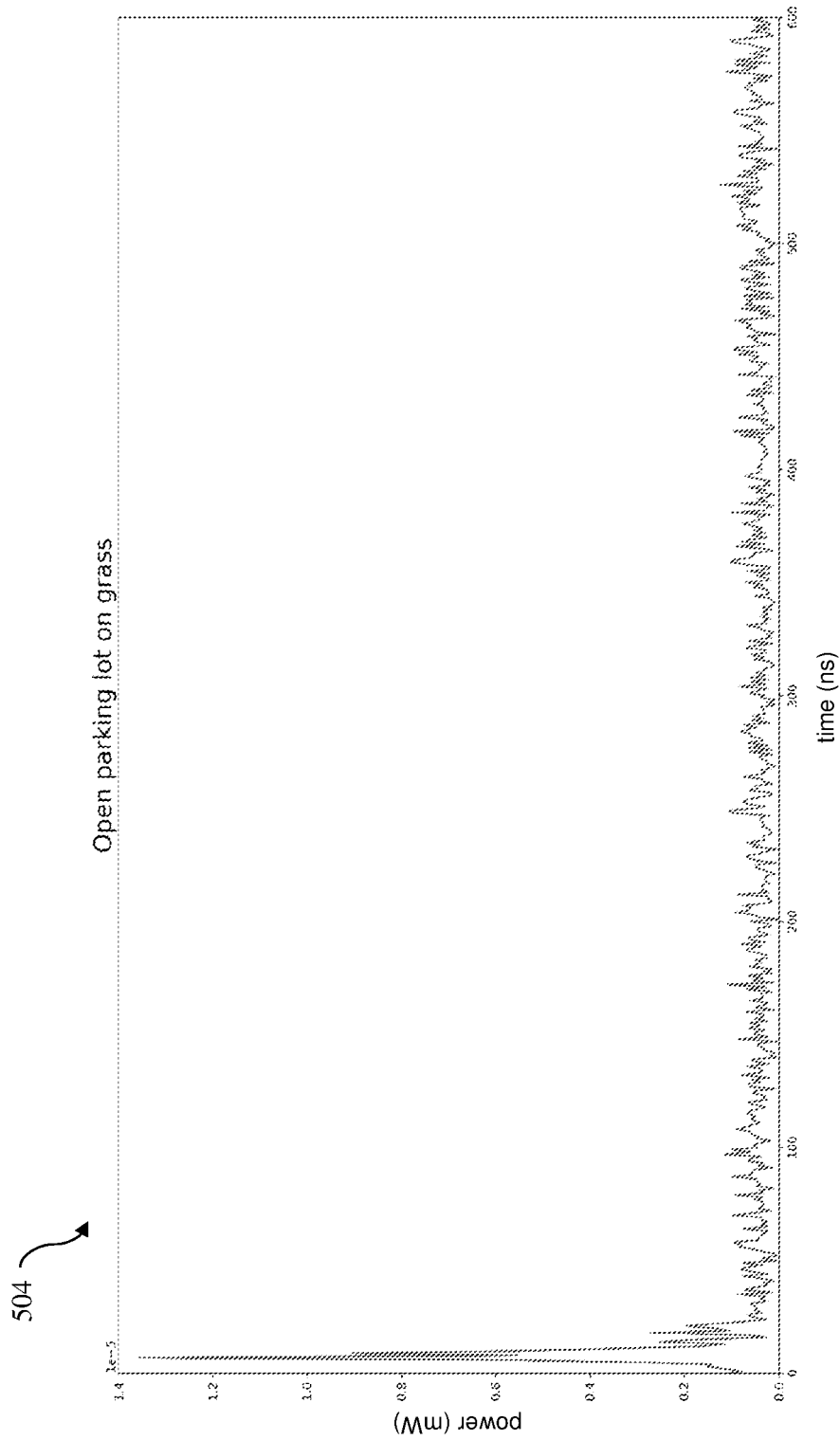
FIG. 5C shows an illustrative embodiment of a channel impulse response in a fully damped environment.

FIGS. 5A to 5C show illustrative embodiments of channel impulse responses 500, 502, 504 in different environments. In particular, FIG. 5A shows an illustrative embodiment of the channel impulse response 500 in a reflective environment, for example a small garage with walls close to the vehicle. Furthermore, FIG. 5B shows an illustrative embodiment of the channel impulse response 502 in a highly damped environment, for example an open parking lot on concrete or asphalt. Finally, FIG. 5C shows an illustrative embodiment of the channel impulse response in a fully damped environment, for example an open parking lot on grass. It is noted that the channel impulse responses 500, 502, 504 in the various environments are significantly different from each other.

Figure 6:
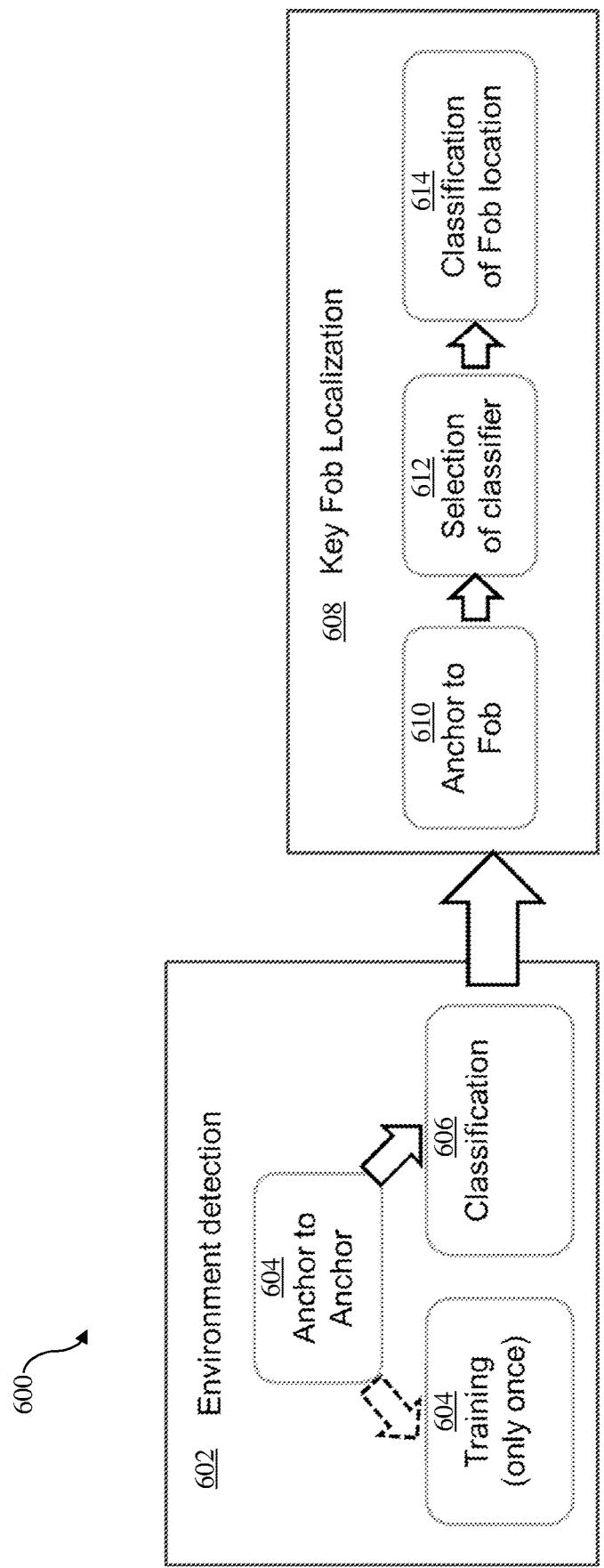
FIG. 6 shows an illustrative embodiment of a localization method.

FIG. 6 shows an illustrative embodiment of a localization method 600. In particular, the method 600 contains an environment detection part 602 and a key fob localization part 608. In the environment detection part 602, a classification 606 may be performed which takes the CIR resulting from an anchor-to-anchor communication 604 as an input. In order to prepare the classifier for actual use, it may be trained 604 by determining the CIR resulting from an anchor-to-anchor communication 604 in different environments, and store the CIR and/or data derived from as reference data for use by the classifier 606 when the latter enters into operation. The training 604 may need to be performed only once. The output of the classifier 606 is used to select a localization process which is used in the key fob localization part 608 of the method 600. In this example, the localization process is implemented by a classifier, which is thus selected in dependence on the output of the classifier 606 used in the first part 602 of the method 600. The selected classifier then performs a classification 614 on the CIR resulting from an anchor-to-fob communication 610, in order to determine the location of the fob.

In particular, in order to implement the environment detection 602, the system may use a machine learning algorithm that can first be trained 604. This training step 604 may be performed only once for a vehicle. During this training step 604, the vehicle is placed in different environments and CIR data are collected during anchor-to-anchor communication 604. Using the machine learning algorithm, a classifier may be trained, and the model may be stored. During regular use, anchor-to-anchor communication 604 is performed, the CIR may be analyzed through the stored model, and the output of the classifier 606 may be regarded as the most probable environment. After the environment detection 602 has been performed, the information on the detected environment (i.e., the most probable environment) is used to choose the best localization algorithm for that environment. The localization algorithm may also be a machine learning algorithm. In that case, several classifier models are stored in the vehicle, and the proper one is used for the analysis of the CIR in the anchor-to-fob communication 610.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 system for facilitating localizing an external object
102 controller
104 UWB communication node
106 UWB communication node
108 UWB communication node
110 UWB communication node
200 method for facilitating localizing an external object
202 Causing, by a controller, at least one of a plurality of UWB communication nodes to transmit one or more UWB messages to other UWB communication nodes of said plurality of UWB communication nodes
204 Receiving, by the controller, a channel impulse responses (CIR) estimate and/or one or more parameters relating to said CIR output by the UWB communication nodes in response to receiving said UWB messages
206 Analyzing, by the controller, said CIR estimate and/or said parameters relating to the CIR
208 Selecting, by the controller, a localization process in dependence on a result of analyzing said CIR estimate and/or said parameters relating to the CIR
300 vehicle
302 body control module (BCM)
304 UWB anchor
306 UWB anchor
308 UWB anchor
310 UWB anchor
312 UWB anchor
314 network
400 environment around a vehicle
402 vehicle
404 UWB anchor
406 UWB anchor
408 UWB anchor
410 UWB anchor
412 UWB anchor
414 wall
416 wall
418 channel impulse response
500 channel impulse response in a reflective environment
502 channel impulse response in a highly damped environment
504 channel impulse response in a fully damped environment
600 localization method
602 environment detection
604 anchor-to-anchor communication
604 training
606 classification
608 key fob localization
610 anchor-to-fob communication
612 selection of classifier
614 classification of fob location

What is claimed is:

1. A system for facilitating localizing an object, the system comprising:
a plurality of ultra-wideband (UWB) communication nodes;
a controller operatively coupled to said plurality of UWB communication nodes, wherein the controller is configured to:
cause at least one of the plurality of UWB communication nodes to transmit one or more UWB messages to other UWB communication nodes of said plurality of UWB communication nodes;
receive a channel impulse response (CIR) estimate and/or one or more parameters relating to said CIR estimate by the other UWB communication nodes in response to receiving said UWB messages;
analyze said CIR estimate and/or said parameters relating to the CIR estimate to determine an environment in which the plurality of UWB communication nodes is located;

select a localization process from a plurality of localization processes in dependence on the determined environment, the selected localization process including a classifier trained for the environment; and determine, using the selected localization process, a location of the object relative to the UWB communication nodes based on signals received from the object at the UWB communication nodes;

wherein the controller is configured to:

analyze said CIR estimate and/or said parameters relating to the CIR estimate using a machine learning algorithm; and feed, in a training phase of the system, the machine learning algorithm with data indicative of an environment around the system.

2. The system of claim 1, wherein the machine learning algorithm is primarily a decision tree algorithm, a neural network, a nearest neighbor algorithm, or a support vector machine.

3. The system of claim 1, wherein the parameters relating to the CIR estimate include at least one of the following parameters:

a power level;
a strongest path amplitude ratio;
a strongest path time difference;
a spectral power;
a first path width; and
a first path prominence.

4. The system of claim 1, wherein the localization process is an algorithm for localizing the object.

5. The system of claim 4, wherein the algorithm for localizing the object is the machine learning algorithm.

6. The system of claim 1, wherein the object is a device for accessing a vehicle, and wherein the plurality of UWB communication nodes are UWB anchors comprised in or attached to said vehicle.

7. The system of claim 6, wherein the device for accessing the vehicle is a key fob or a mobile device.

8. The system of claim 1, wherein the object is a device for accessing a vehicle, and wherein the plurality of UWB communication nodes are UWB anchors comprised in or attached to said vehicle.

9. The system of claim 1, wherein the localization process comprises a second machine learning algorithm trained for the determined environment.

10. A method for facilitating localizing an external object, the method comprising:

in a training phase of a system:
feeding a machine learning algorithm with data indicative of an environment around the system, the machine learning algorithm includes one of a decision tree algorithm, a neural network, a nearest neighbor algorithm, or a support vector machine; and in an operating phase of the system:
causing, by a controller, at least one of a plurality of UWB communication nodes to transmit one or more UWB messages to other UWB communication nodes of said plurality of UWB communication nodes;

receiving, by the controller, a channel impulse response, CIR, estimate and/or one or more parameters relating to said CIR estimate by the other UWB communication nodes in response to receiving said UWB messages;

analyzing, by the controller using the machine learning algorithm, said CIR estimate and/or said parameters relating to the CIR estimate;

selecting, by the controller, a localization process in dependence on a result of analyzing said CIR estimate and/or said parameters relating to the CIR estimate.

11. The method of claim 10, wherein the parameters relating to the CIR estimate include at least one of the following parameters:

a power level;
a strongest path amplitude ratio;
a strongest path time difference;
a spectral power;
a first path width; and
a first path prominence.

12. The method of claim 10, wherein the localization process comprises a second machine learning algorithm trained for an environment in which the plurality of UWB communication nodes is located.

13. The method of claim 10, further comprising determining, by the controller using the selected localization process, a location of the external object relative to one or more of the plurality of UWB communication nodes based on signals received from the external object at the plurality of UWB communication nodes.

14. A computer program on a non-transitory computer readable medium comprising executable instructions which, when executed by a controller, cause said controller to carry out processes comprising:

in a training phase, feeding a machine learning algorithm with data indicative of a plurality of environments around a system, the plurality of environments having different characteristics; and in an operating phase:
causing, by a controller associated with the system, at least one of a plurality of UWB communication nodes coupled to the system to transmit one or more UWB messages to other UWB communication nodes of said plurality of UWB communication nodes;

receiving, by the controller, a channel impulse response, CIR, estimate and/or one or more parameters relating to said CIR estimate by the UWB communication nodes in response to receiving said UWB messages;

analyzing, by the controller, said CIR estimate and/or said parameters relating to the CIR estimate to determine an environment in which the plurality of UWB communication nodes is located;

selecting, by the controller, a localization process including the machine learning algorithm corresponding to the environment in dependence on a result of analyzing said CIR estimate and/or said parameters relating to the CIR estimate; and determining, by the controller using the selected localization process, a location of an external object relative to the UWB communication nodes based on signals received from the external object at the UWB communication nodes.

15. The computer program of claim 14, wherein the localization process is an algorithm for localizing the external object.

16. The computer program of claim 14, wherein the external object is a device for accessing a vehicle, and wherein the plurality of UWB communication nodes are UWB anchors comprised in or attached to said vehicle.

17. The computer program of claim 14, wherein the localization process comprises a machine learning algorithm trained for an environment in which the plurality of UWB communication nodes is located.

\* \* \* \* \*